United States Patent [19]
Duncan et al.

[11] Patent Number: 5,598,261
[45] Date of Patent: Jan. 28, 1997

[54] WAVEFRONT SENSOR FOR A SCANNING IMAGER

[75] Inventors: Alan L. Duncan, Sunnyvale, Calif.; Daniel S. Acton, Riverton, Wyo.; Richard L. Kendrick, Foster City, Calif.

[73] Assignee: Lockheed Missiles & Space Company, Inc., Sunnyvale, Calif.

[21] Appl. No.: 499,608

[22] Filed: Jul. 7, 1995

[51] Int. Cl.[6] ........................................ G01J 1/20
[52] U.S. Cl. ........................... 356/121; 250/201.9
[58] Field of Search .................. 356/121, 124.5, 356/353, 354, 359, 360; 250/201.9; 359/853, 859, 849

[56] References Cited

U.S. PATENT DOCUMENTS

| | | | |
|---|---|---|---|
| 3,980,879 | 9/1976 | O'Meara | 250/201.9 |
| 4,141,652 | 2/1979 | Feinleib | 356/121 |
| 4,409,602 | 1/1982 | Gonsalves et al. | 250/201.9 |
| 4,696,573 | 9/1987 | Hutchin | 356/353 |
| 4,824,243 | 4/1989 | Wheeler et al. | 356/121 |
| 5,120,128 | 6/1992 | Ulich et al. | 356/121 |
| 5,128,530 | 7/1992 | Ellerbroek et al. | 356/121 |
| 5,157,459 | 10/1992 | Oono et al. | 356/359 |
| 5,229,592 | 7/1993 | Horwitz et al. | 250/201.9 |
| 5,229,889 | 7/1993 | Kittell | 359/849 |
| 5,287,165 | 2/1994 | Ulich et al. | 356/121 |
| 5,300,766 | 4/1994 | Granger et al. | 250/201.9 |
| 5,384,455 | 1/1995 | Paxman | 356/121 |

*Primary Examiner*—Hoa Q. Pham
*Attorney, Agent, or Firm*—Feix & Feix; Henry J. Groth

[57] ABSTRACT

A wavefront sensor for use in a scanning imaging system for generating focused and defocused images of an object scene that is being imaged by the imaging system from a single input optical beam impinged thereon. The two images are combinable using phase diversity techniques for calculating the wavefront aberrations that are present in the imaging system. The wavefront sensor includes a first linear photodetector array for forming a best focused image of an object scene as an incoming optical beam scans across the first linear photodetector array. The wavefront sensor further includes a second photodetector array disposed parallel to the first photodetector array. The second photodetector array is provided with a compensator plate for inducing a known focus error in the image that is formed on the second photodetector array as the input optical scans across the second photodetector array. In one embodiment, the two photodetector arrays are configured as CCD arrays on a single substrate. In a second embodiment, each of the first and second photodetector arrays are configured as a plurality of spaced detector segments. The respective spaced detector segments of the first and second detector arrays are arranged in staggered relation and define regions of overlap therebetween. One or more of the regions of overlap associated with the second photodetector array include a compensator plate for inducing the known focus error.

22 Claims, 7 Drawing Sheets

FIG_4

FIG_10

WAVEFRONT SENSOR FOR A SCANNING IMAGER

BACKGROUND OF THE INVENTION

1. Field of the Invention

The present invention relates generally to optical imaging systems, and more particularly to an improved wavefront sensor for providing an accurate measurement of the wavefront errors in adaptive optics imaging systems.

2. Brief Description of the Prior Art

Many imaging systems are limited in their performance by the presence of optical wavefront errors. Adaptive optics are capable of removing these wavefront errors but only if an accurate measurement of the wavefront is available. Therefore, a wavefront sensor must be incorporated into the imaging system.

Hartmann wavefront sensors and shearing interferometers have been used in the past for estimating wavefront errors in adaptive optics systems.

Hartmann wavefront sensors, however, are limited in that they can only make measurements from point sources, such as a star or a laser beacon. Thus, such wavefront sensors require the use of locally generated reference beams in order to measure such quantities as image intensity or wavefront phase or tilt. The use of additional reference beams is undesirable as they add to the overall complexity of the wavefront sensor and can introduce additional sources of scattered light which can have an adverse affect on the measurements of interests.

Of particular interest for imaging systems is a wavefront sensor which uses photons collected from the object scene to provide information on the optical aberrations of the imaging system. A shearing interferometer is an example of such a wavefront sensor but a shearing interferometer also is optically very complex as it requires reimaging optics for measurement of the wavefront at a pupil.

Phase retrieval is a known technique whereby the optical-system aberrations are derived directly from image intensity-data. The wavefront sensors used in the phase retrieval technique are therefore very simple. However, phase-retrieval algorithms which use only a single image of an object scene require some knowledge of the object-scene content such as the location of isolated point sources within the imaged field of view. This limits their usefulness to particular applications for which appropriate knowledge of the scene content is available.

Phase diversity is an extension of the phase retrieval concept whereby two images, one containing a known aberration, are compared to determine the optical-system aberrations. Phase diversity algorithms that are independent of the object-scene content can be defined, making them useful for a broad range of adaptive optics applications. The phase diversity concept is described in a paper by R. A. Gonsalves entitled "Phase retrieval and diversity in adaptive optics," Opt. Eng. 21 829–832 (1982).

It would be desirable to develop an optically simple wavefront sensor which is effective to receive a single optical input beam and provide two images of an object scene as output, wherein one of the images has an additional known aberration. Such a wavefront sensor could then be used in combination with phase diversity techniques for estimating the wavefront errors of an optical system.

It would further be desirable to develop such a phase diversity wavefront sensor which could be easily implemented in conventional staring and scanning type imaging systems with little or no modifications to the existing focal plane architecture of such staring and scanning imaging systems.

SUMMARY OF THE INVENTION

It is an object of the present invention to provide a wavefront sensor for use in estimating wavefront aberrations in an imaging system which is optically very simple in design and is of low cost to implement in existing adaptive optics imaging systems.

The present invention discloses a phase diversity wavefront sensor for use in optical imaging systems and which permits wavefront measurements from any object being imaged by the imaging system. The wavefront sensor forms an image from the best focus of an imaging system such as a telescope and also forms an additional image which is made slightly out of focus. Taken together, the two images can be analyzed in accordance with phase diversity techniques to determine the wavefront errors of the imaging system. Since most imaging systems are already configured to form an image, the phase diversity wavefront sensor of the present invention can be implemented with very few additional optical elements.

Conventional wavefront sensors tend to be optically complex. The phase diversity wavefront sensor of the present invention is optically very simple and can be used in combination with both staring and scanning imaging systems.

In the case of a staring imager, the wavefront sensor comprises a beamsplitter and prism combination which divides a single optical input beam into two identical half beam portions. A first half beam portion is directed to a primary focal plane comprising a detector array such as a CCD and a best focused image is formed thereon. The second half beam portion is transmitted through a phase plate or compensator plate before it impinges on a secondary focal plane also comprising a CCD detector. A second image, made slightly out of focus due to the focus error induced by the phase plate, is formed on the secondary focal plane. The thickness and index of refraction of the phase plate are selected in accordance with the f-number of the optical system in order to provide a desired focus error, typically 0.5 to 2.5 waves.

The wavefront errors of the imaging system are then determined by analyzing the focused and defocused images in Fourier space. The images are combined to form two functions. Namely the sharpness metric and the power metric. Both of these functions are independent of the object. Together they uniquely characterize the wavefront. The metrics can be used to perform post processing of the image for improved resolution or can be used to provide real time aberration control to the imaging system.

Many imaging systems make use of scanning linear detector arrays in a focal plane. In this case, a phase diversity wavefront sensor for use in a scanning imaging system can be implemented by merely placing a second linear detector array next to the original detector array. The defocus can be introduced by covering the second array with a glass plate such that a phase diversity image is formed nearly simultaneously with a best focused image as the object scene is scanned across the two detector arrays.

In accordance with a first scan mode wavefront sensor embodiment, the wavefront sensor comprises a CCD detector chip provided with two linear detector arrays. The linear detector arrays are preferably provided with Time and Delay Integration (TDI) capability for low light level imaging applications. One of the linear arrays is covered by a glass plate having a thickness that is selected in accordance with the f-number of the optical system which is forming the image. This integrated design is very simple and inexpensive to manufacture and does not require any reimaging optics to form the best focused and defocused images.

In accordance with a second scan mode wavefront sensor embodiment, a second linear detector array comprising a plurality of spaced apart detector segments is placed next to an original linear array of detector segments. One or more glass plates are placed over the second array of detector segment in the regions of overlap between the two linear detector arrays. In the regions of overlap that include a glass plate, two images will be formed nearly simultaneously as the object scene is scanned thereacross.

It should be noted that the addition of the second array will not effect the optical design or the original focal plane architecture. This is an ideal solution for retrofitting existing scanning imaging systems with a wavefront sensor. It should also be noted that the second array does not take light away from the original array. This is a major advantage over conventional wavefront sensors which often require more than one half of the light from the imaging system.

Methods and apparatus which incorporate the features described above and which are effective to function as described above constitute specific objects of this invention.

These and other objects and advantages of the present invention will no doubt become apparent to those skilled in the art from the following drawings, detailed description of the preferred embodiment and the appended claims.

IN THE DRAWING

FIGS. 6–7 illustrate alternate embodiments of the wavefront sensor of the present invention specially constructed for use in scanning-type optical imagers, wherein.

DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
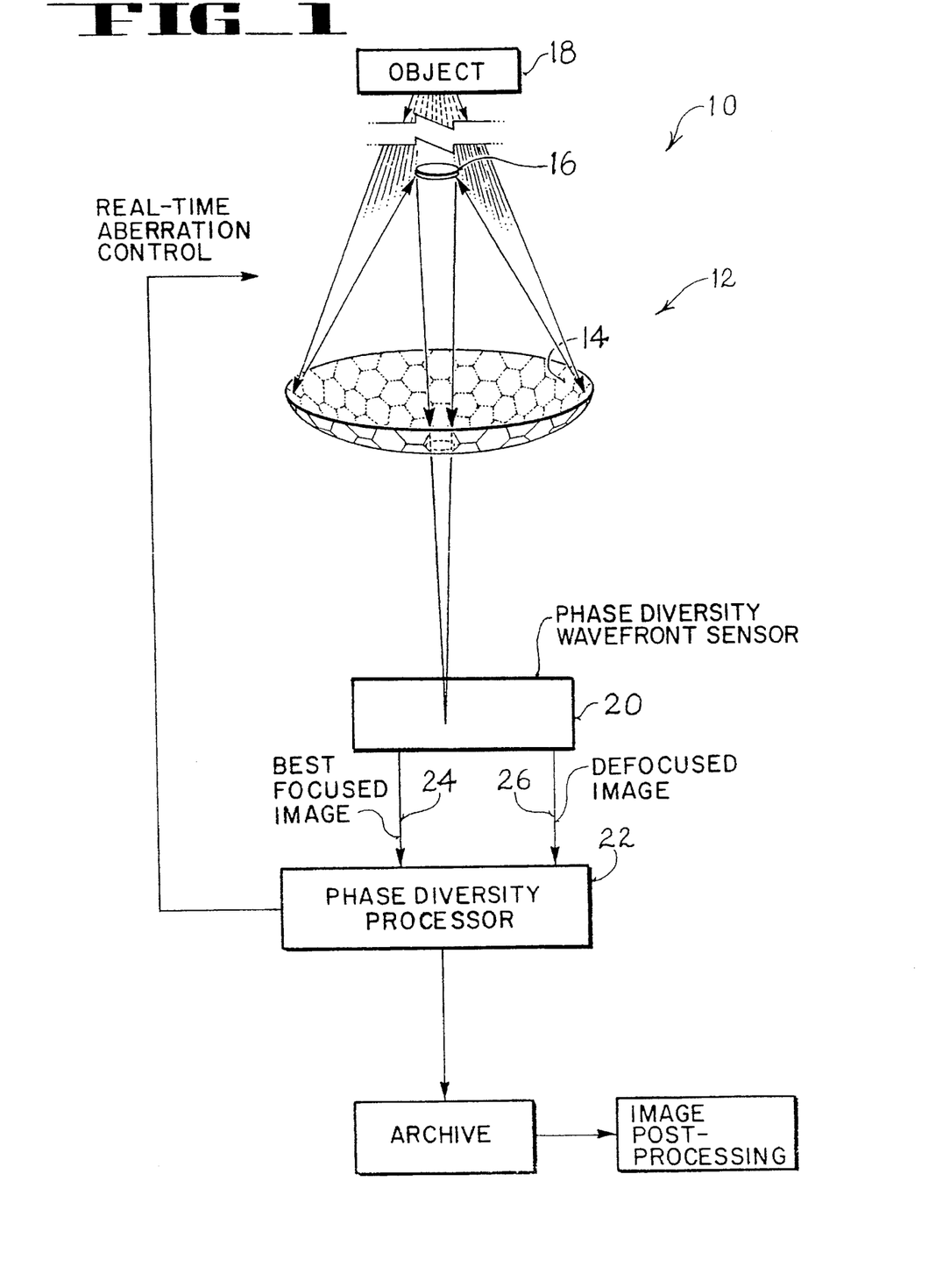
FIG. 1 is a schematic view of an optical imaging system which incorporates a phase diversity wavefront sensor of the present invention.

FIG. 1 is a schematic illustration of an optical imaging system 10 which uses phase diversity techniques to analyze two images taken of an object, one of which contains an additional known aberration, to determine the optical system aberrations.

The optical imaging system 10 includes input optics 12 in the form of a telescope having a deformable mirror 14 and an opposed smaller mirror 16 which, taken together, are operative to form an image of an object 18 under view onto a wavefront sensor 20. The deformable mirror 14 is preferably made up of multiple mirror segments which are position adjustable via conventional piston-type actuator control means. The wavefront sensor 20 provides output information to a computer or processor 22 about a best focused image 24 and a defocused image 26 of the object 18 under view. The output from the processor 22 may be archived for use in post processing of the best focused image or may be used for real-time aberration control by providing electronic correction signals to the piston actuators of the deformable mirror 14.

Figure 2:
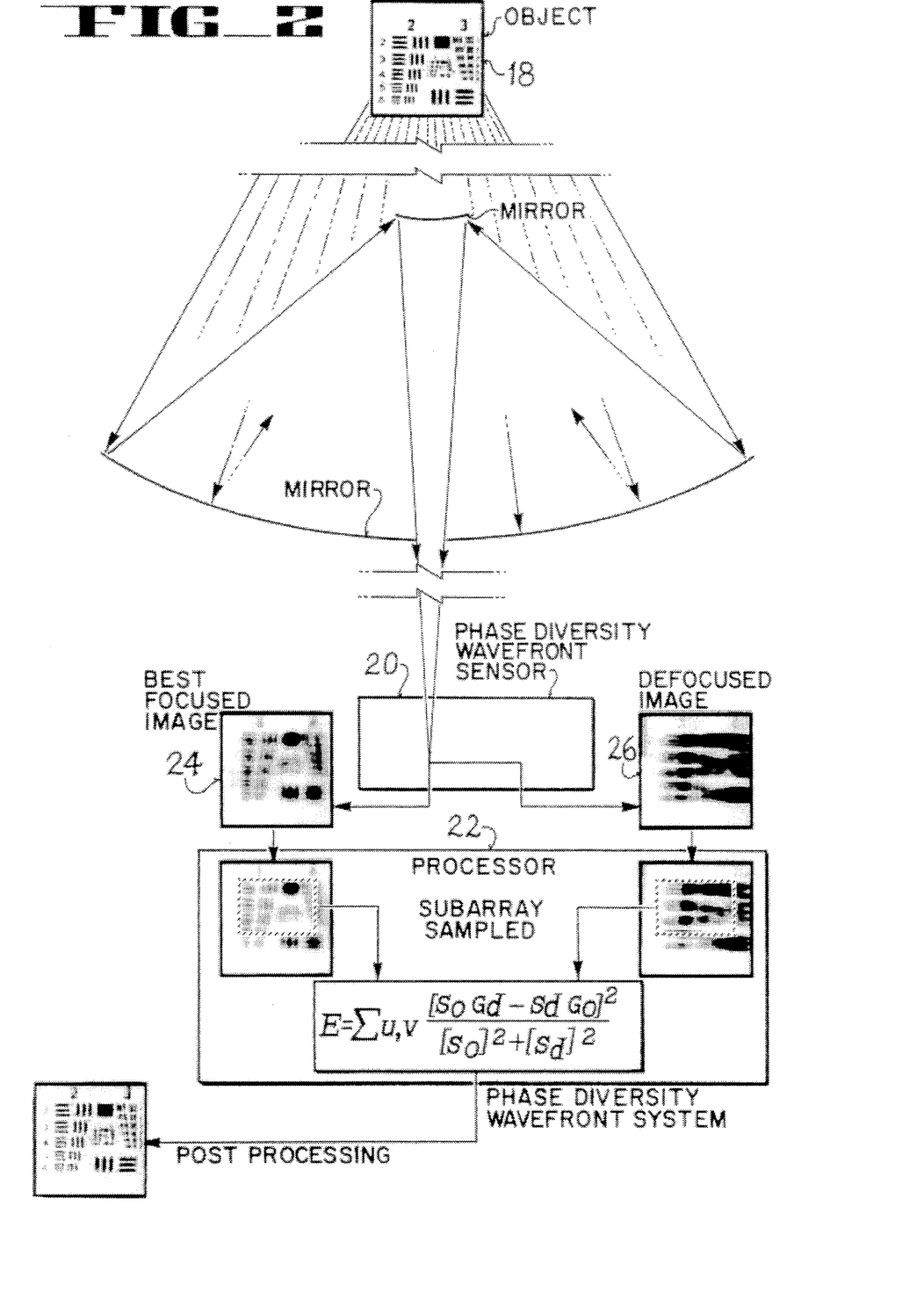
FIG. 2 is a schematic view similar to FIG. 1 which illustrates in greater detail a particular application of the phase diversity wavefront sensor for post processing of images.
Figure 3:
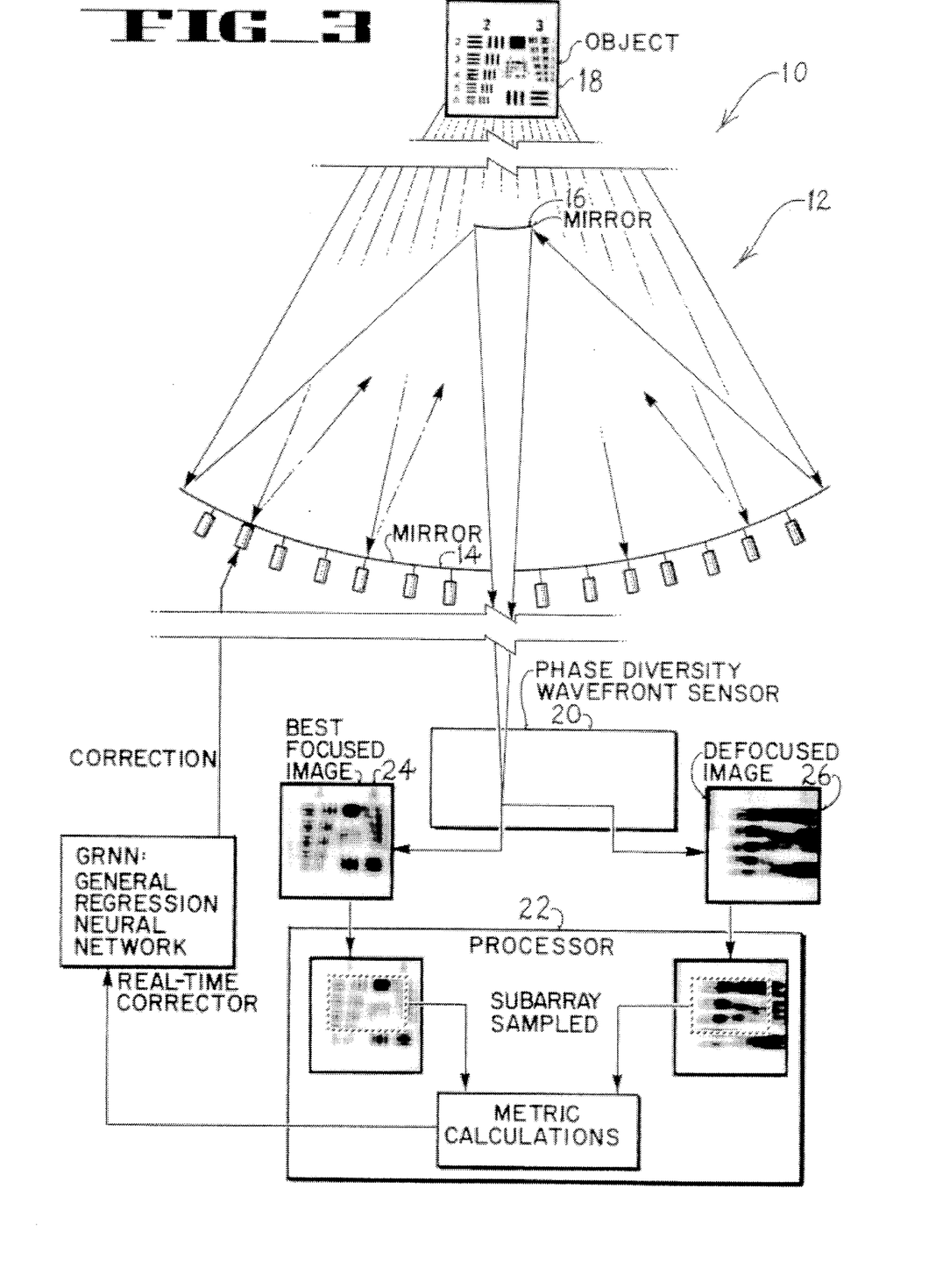
FIG. 3 is a schematic view similar to FIG. 1 which illustrates in greater detail a second application of the wavefrout sensor for real time aberration control of a deformable mirror.

FIGS. 2 and 3 show more detailed schematic system views of optical imagers similar to that shown in FIG. 1 which illustrates the use of phase diversity techniques and the phase diversity wavefront sensor of the present invention to provide improved image post processing (see FIG. 2) and real-time aberration control to the optical imager system (see FIG. 3).

The term "phase diversity" as used herein refers to methods for determining optical wavefront errors by measuring the intensity distribution in the 3-dimensional volume surrounding the focal plane of an imaging system. These techniques involve forming an image at the best focus and an additional image taken slightly out of focus. Once determined, the wavefront errors can be applied to both the focused and defocused images in a post-facto image enhancement process to reconstruct the true object (FIG. 2) or conjugated with a closed-loop active optical system (FIG. 3).

The phase diversity technique extracts the optical transfer function (OTF) from the multiple images collected by the wavefront sensor 20. The basic phase diversity concept consists of the following formalism.

| x; spatial coordinates | u; spatial frequencies |
|---|---|
| f(x); object function | F(u); Fourier transform |
| s(x); point spread function | S(u); Fourier transform |
| g(x); image function | G(u); Fourier transform |

The image is the convolution of the object function and the optical system point spread function.

$$g(x)=f(x)*s(x)$$

In Fourier transform space the image becomes the product of the object function and the optical transfer function.

$$G_o(u)=F(u)S_o(u)$$

An additional phase diversity image is produced by adding a known phase aberration to the optical system.

$$G_d(u) = F(u)S_d(u)$$

In accordance with the present invention, the known phase aberration is a focus error, preferably in a range of about 0.5 to about 2.5 waves.

Although several algorithms exist for determining wavefront errors, the phase diversity wavefront sensor of the present invention will be described with reference to two algorithms in particular.

The first algorithm employed is shown in FIG. 2 and utilizes what is known as "the method of Gonsalves". In accordance with this method, the wavefront is parameterized by a set of coefficients which provide a best fit to the wavefront. The coefficients could be Zernike polynomials, piston and tilt values of a segmented aperture, misalignment terms in a telescope, etc. The weight of each term is chosen so that the following quantity is a minimum:

$$E = \Sigma_{u,v} \frac{[S_o G_d - S_d G_o]^2}{[S_o]^2 + [S_d]^2}$$

where $S_o$ and $S_d$ refer to the optical transfer functions associated with the focused and defocused wavefronts. When E is minimized, the wavefront will be properly represented by the coefficients.

As shown in FIG. 2, the processor 22 uses the method of Gonsalves as described above to calculate a metric which best characterizes the wavefront.

As is shown in the example optical imager system embodiment of FIG. 3, the processor 22 in this case employs a second algorithm for determining the wavefront errors of the optical imager system. In this example, the algorithm applies a General Regression Neural Network (GRNN) to the images in Fourier space. An object-independent metric is created by taking ratios of the Fourier spectra of the images. The wavefront errors are then determined by comparing the metrics, as calculated from the image data, to an ensemble of metrics calculated in advance. The comparison is performed by the GRNN. Two different rational combinations are formed, namely the "Power Metric" and the "Sharpness Metric". These metrics are given by:

$$M_P = \frac{G_o^* G_o - G_d^* G_d}{G_o^* G_o + G_d^* G_d}$$

$$M_S = \frac{G_o^* G_d - G_d^* G_o}{G_o^* G_o + G_d^* G_d}$$

where $G_o$ and $G_d$ refer to the Fourier spectra of the focused and defocused images, respectively. Both of these functions are independent of the object and uniquely characterize the wavefront. The metrics can be used to provide real time correction of the aberrations of the optical system.

For an in depth discussion of the underlying mathematics involved with the two above described algorithms see our prior written publication: "Phase-Diversity Wavefront Sensor For Imaging Systems", Applied Optics, Vol. 33, No. 27, published 20 Sep. 1994.

The phase diversity wavefront sensor of the present invention can be used in either a staring or a scanning imager application. The conceptual design for the sensor is different for the two applications.

Figure 4:
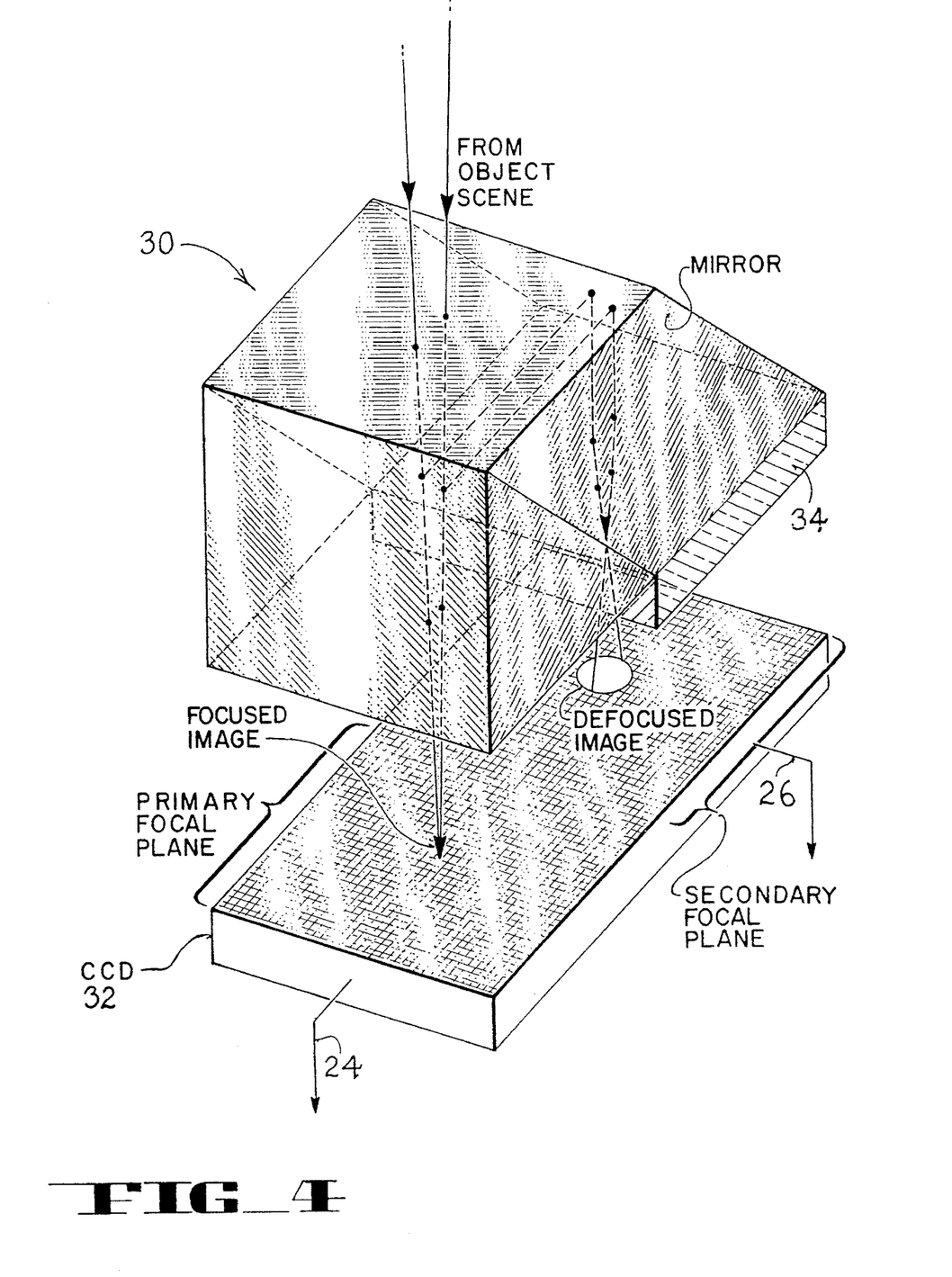
FIG. 4 is an enlarged isometric perspective view of a first embodiment of the wavefront sensor of the present invention specially constructed for use in staring-type optical imagers.
Figure 5:
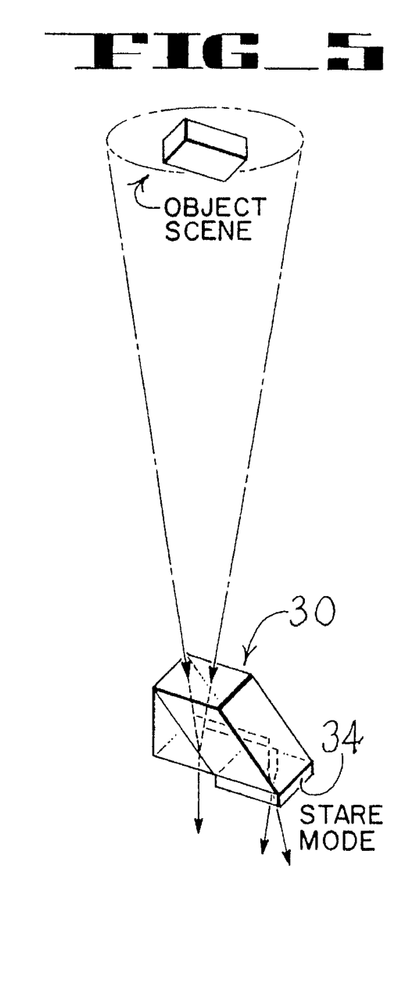
FIG. 5 shows an object as it is being imaged onto the stare mode wavefront sensor embodiment of FIG. 4.

A preferred design of the phase diversity wavefront sensor that is adapted for use in a staring optical imager is shown in FIGS. 4–5.

In the case of a staring imager, the two phase diversity focal planes (i.e. primary and secondary focal planes) must share the same field of view in order to obtain images of identical sections of the object scene. The preferred wavefront sensor design, therefore, comprises beamsplitter means such as the combination beamsplitter and prism assembly 30 shown in the drawings. Alternatively, the beamsplitter means may comprise other like aperture-sharing assembly with good results. The incoming optical beam from the object scene is split into two identical half beam portions by the beamsplitter and prism assembly 30. The half beam portions are then directed onto a photodetector 32 which lies within the focal plane of the imaging system.

A preferred photodetector for use in the present invention comprises a simple charged couple device (CCD) which may be configured as a single array in the focal plane of the imager system as shown. As is seen in FIG. 4, the photodetector 32 includes a primary focal plane and a secondary focal plane. The primary focal plane refers to that portion of the imager system's focal plane on which a first half beam portion corresponding to a best focused image is formed on the photodetector 32. Similarly, the secondary focal plane refers to that portion on the imager system's focal plane on which a second half beam portion containing a known focus error is formed on the photodetector 32. In the example shown, the primary focal plane and the secondary focal plane are coplanar and form a single CCD array. Alternately, the primary and secondary focal planes may lie in different planes, in which case the photodetector is advantageously configured as two separate CCDs, one for each of the primary and secondary focal planes. Thus, the photodetector 32 may, for example, comprise either a one or two dimensional CCD array for collection of the focused and defocused images.

A compensator or phase plate 34 is interposed between the secondary focal plane of photodetector 32 and the beamsplitter and prism assembly 30 and is effective to induce a focus error within the half beam portion that is transmitted therethrough. The phase plate 34 preferably comprises a transmissive glass-like material having a thickness and index of refraction which is selected in accordance with the f-number of the optical imager system in order to provide a desired amount of defocus. The amount of defocus will vary depending on the application but is preferably within a range of about 0.5 to about 2.5 waves. Sapphire is an exemplary glass material which may be used as the phase plate in the present invention with good result.

The primary focal plane serves two functions: (1) it provides the final image; and (2) it provides the best focused image data via data line 24 to the phase diversity processor 22. The second focal plane, offset to defocus the image, also provides data to the phase diversity processor 22 along data line 26. As described above, the processor 22 can either archive the focused and defocused image data for image post processing or evaluate the data in real time to compensate the optical system to correct wavefront aberrations. In a staring imager application it is important to calibrate and maintain pixel registration between the two focal planes and the amount of defocus in the defocused image focal plane.

With reference to FIGS. 6–10, a wavefront sensor for use in a scanning imager will now be described. In conventional scanning imager applications, the primary focal plane is typically linear CCD array with time and delay integration (TDI) which may contain thousands of pixels in the cross scan direction. By contrast, the phase diversity images (i.e. the defocused images) only require a few hundred pixels.

The wavefront sensor for use in a scanning image of present invention also makes use of linear detector arrays but further employs defocusing means to generate a second defocused image nearly simultaneously with the generation of a first best focused image of the object scene. Since the image is being scanned across the linear arrays, no beamsplitter is required in the scanning imager application.

Figure 6:
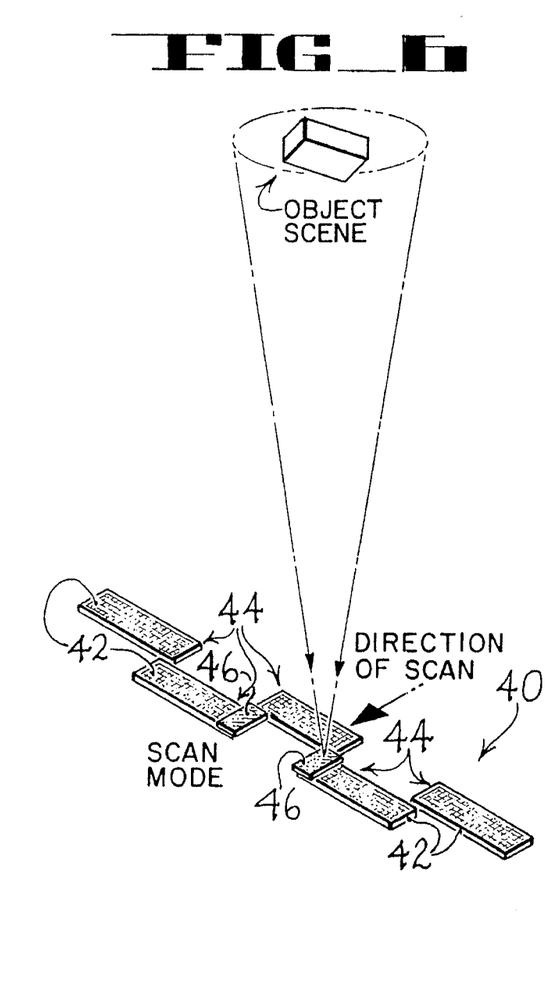
FIG. 6 shows an object being imaged onto a first scan mode wavefront sensor embodiment.
Figure 8:
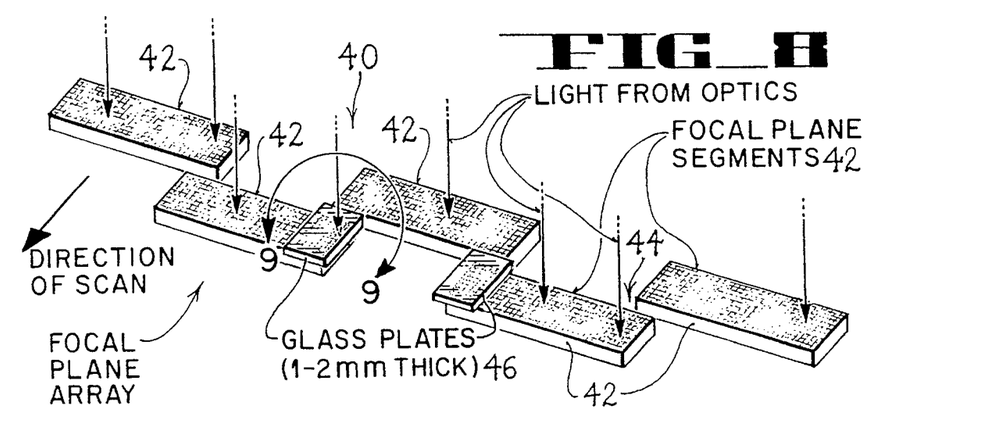
FIG. 8 is an enlarged isometric perspective view of the scan mode wavefront sensor embodiment of FIG. 6.
Figure 9:
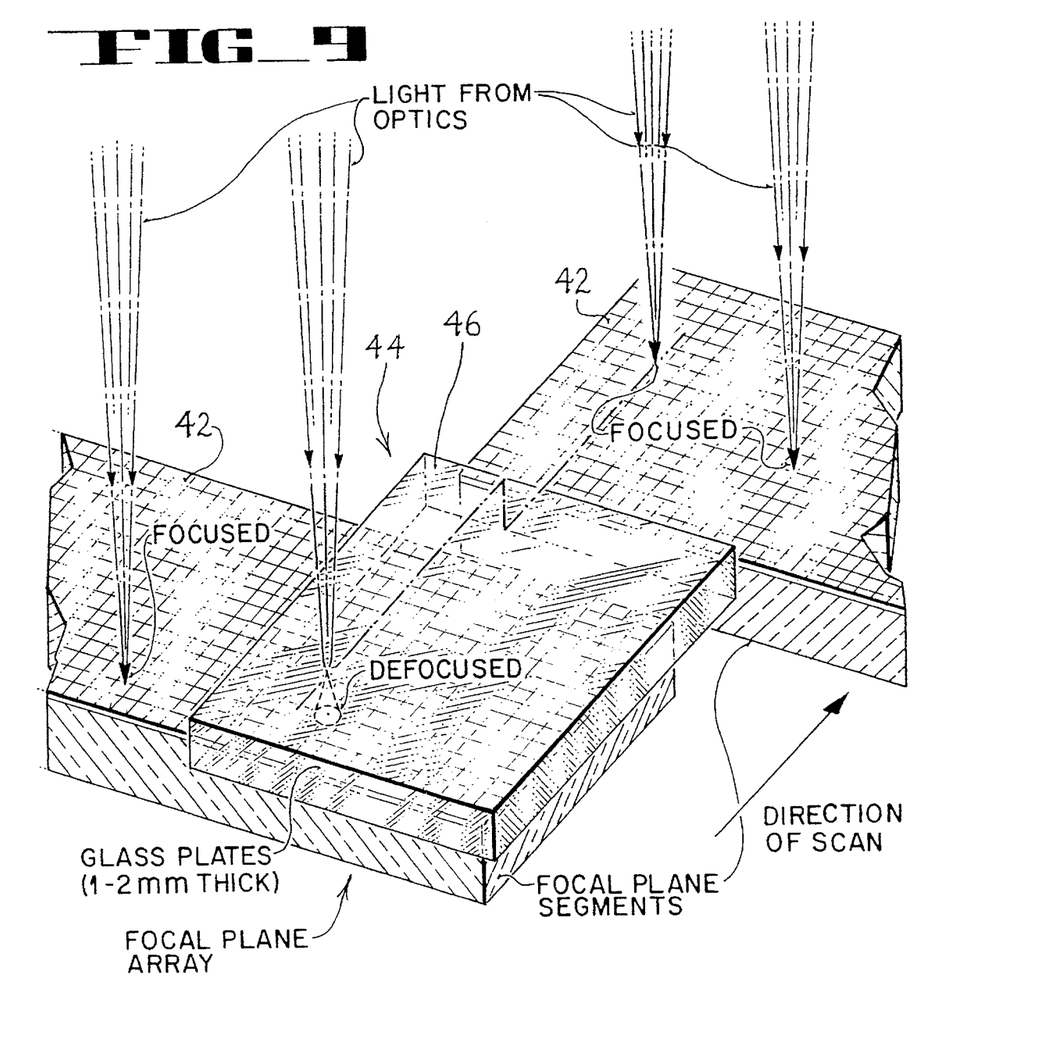
FIG. 9 is an enlarged perspective view of the encircled region denoted by arrow 9—9 in FIG. 8.

A wavefront sensor for use in a scanning imager constructed in accordance with a one embodiment of the present invention is shown in FIGS. 6, 8 and 9 and is designated generally by reference numeral 40. In this embodiment, the linear focal plane is broken up into two, side by side, columns of spaced apart segments 42. The two columns of spaced segments 42 are staggered such that they define overlap regions 44 at the segment boundaries or end portions.

As best seen in FIG. 9, two images of the same object scene are formed in the overlap regions 44 with a small time delay which depends on the separation in the scan direction of the two focal plane segments. A glass plate 46 is placed over one of the focal plane segments 42 in the overlap regions 44 to defocus one of the images by about 1 wave. The thickness of the glass plate is selected in accordance with the f-number of the optical system in order to provide the desired amount of defocus and is preferably in a range of about 1 to 2 mm total thickness.

As described above, the processor 22 can combine the focused and defocused images and extract a measurement of the wavefront aberrations in the optical system at the field point associated with the overlap region independent of the content of the scene which is being imaged. The resulting information can be used in the post processing of the image to improve image quality or in real time to correct the aberrations if the imager is an adaptive optics system. The number of glass plates 46 that are used would depend on the application at hand. While only one overlap region need be covered by a glass plate to provide a phase diversity image (i.e. a defocused image of the object scene), for best results, it is recommended that the single glass plate be located in the diffraction-limited portion of the field of view of the input optics of the imager system. A greater number of glass plates may be used to measure field dependent errors if desired or to provide redundancy.

This embodiment advantageously make use of existing focal plane architecture and allows for simple modification by adding glass plates to the overlap regions. The focused and defocused images formed at the overlap regions provide the capability to measure wavefront errors. The wavefront data is read out as part of the normal focal plane data stream and no additional hardware is required. Unlike the prior art sensors, the additional of the second linear detector array does not take away light from the original array.

Figure 7:
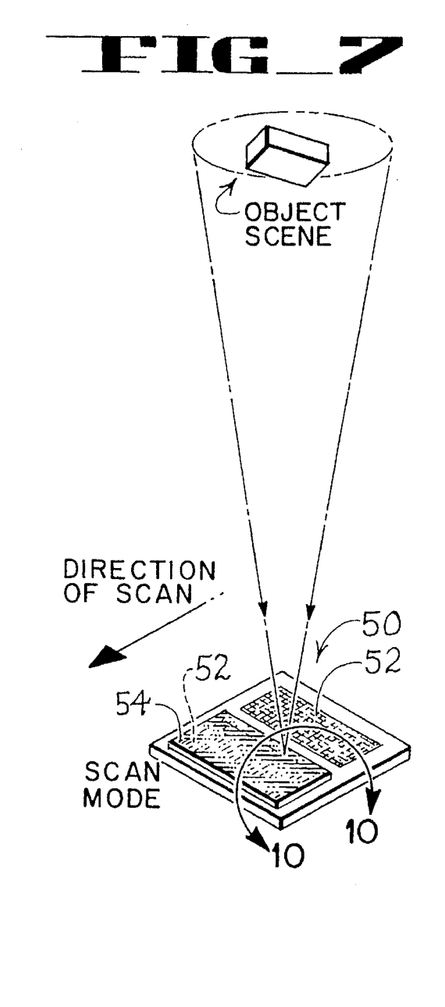
FIG. 7 shows an object being imaged onto a second scan mode wavefront sensor embodiment.
Figure 10:
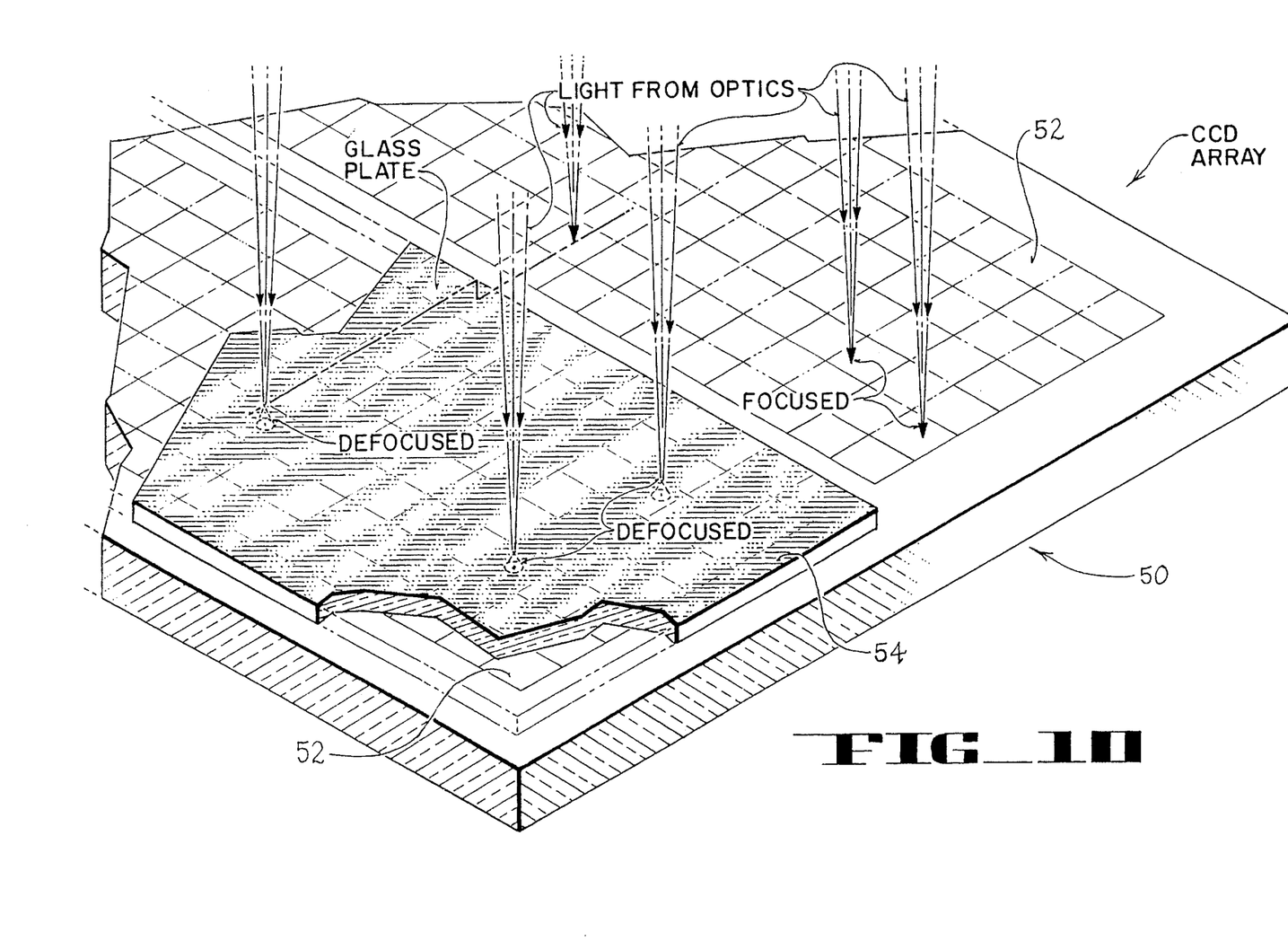
FIG. 10 is an enlarged perspective view of the encircled region denoted by arrow 10—10 in FIG. 9.

A wavefront sensor for use in a scanning imager constructed in accordance with another embodiment of the present invention is shown in FIGS. 7 and 10 and is designated generally by reference numeral 50. In this embodiment, the wavefront sensor 50 comprises a photodetector, preferably an integrated CCD detector chip having two side by side detector arrays 52. In a advantageous embodiment of the invention, the linear detector arrays have time and delay integration (TDI) capability for low light level imaging applications. One of the detector arrays 52 is covered by a glass plate 54 having a thickness that is selected in accordance with the f-number of the optical system which is forming the image. The glass plate 54 is effective to induces a desired focus error, preferably about ¾ of a wavelength of the input optical beam.

In use, a best focused and slightly defocused image are formed nearly simultaneously as the imaged scene is scanned across the sensor. The two images are sent to the phase diversity processor which combines them in a scene independent way to form a function which described the optical aberrations in the imaging system. The resulting information can be used in the post processing of the image to improve image quality or in real time to correct the aberrations if the imager is an adaptive optics system.

In this embodiment, each linear detector array 52 sees the object scene at a slightly different time as the image scans across its field of view. The only requirement is that all of the line arrays be located within the diffraction limited portion of the telescope field of view. In this design it is trivial to maintain the focal plane registration and the amount of defocus. The integrated design ensures that these requirements are met. The integrated design on a single substrate also minimizes the time delay between the two phase diversity images and leads to an extremely simple and compact sensor. Multiple phase diversity sensors can be added to accessible regions of the telescope field of view to measure field dependent errors if desired or to provide redundancy.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. In a scanning imaging system, a wavefront sensor for generating focused and defocused images of an object scene that is being imaged by the imaging system from a single input optical beam impinged thereon, and wherein the focused and defocused images are combinable to estimate optical wavefront aberrations present in the imaging system, the wavefront sensor comprising:

a) a first and a second detector means disposed in substantially parallel relation to one another and lying within a common focal plane of the imaging system, said first and second detector means for generating a first and second image, respectively, as an input optical beam moves over said first and second detector means in a cross scan direction;

b) defocusing means disposed over at least a portion of said second detector means for inducing a known field-independent focus error in said input optical beam prior to impingement on said second detector means; and wherein c) said first image generated by said first detector means defining a best focused image of the object scene and said second image generated by said second detector means and said defocusing means defining a slightly defocused image of the object scene.

2. The wavefront sensor according to claim 1 which further includes:

a) computer means responsive to said first and second detector means for combining said best focused image and said slightly defocused image in a scene independent way to form a function which describes the optical wavefront aberrations present in the imaging system;

b) said computer means having an output indicative of said optical wavefront aberrations; and c) image processing means responsive to said output from said computer means for removing said optical wavefront aberrations from said first image to provide a corrected image with improved resolution.

3. The wavefront sensor according to claim 1 which further includes:

a) computer means responsive to said first and second detector means for combining said best focused image and said slightly defocused image in a scene independent way to form a function which describes the optical wavefront aberrations present in the imaging system;

b) said computer means having an output indicative of said estimated wave front aberrations; and c) said output from said computer means being adapted to drive an input of a deformable mirror.

4. The wavefront sensor according to claim 1 wherein:

a) said first detector means comprises a linear CCD detector array; and b) said second detector means comprises a linear CCD detector array.

5. The wavefront sensor according to claim 4 wherein said first and second linear CCD detector arrays are disposed on a single substrate.

6. The wavefront sensor according to claim 4 wherein said defocusing means comprises a glass plate having a thickness and index of refraction selected to provide a focus error in a range of about 0.5 to about 2.5 waves.

7. The wavefront sensor according to claim 6 wherein said first and second linear CCD detector arrays are located within a diffraction-limited portion of a field of view of an input optics of the imaging system.

8. The wavefront sensor according to claim 1 wherein:

a) said first detector means comprises a first plurality of spaced apart CCD detector segments arranged in linear end to end fashion;

b) said second detector means comprises a second plurality of spaced apart CCD detector segments arranged in linear end to end fashion;

c) said second plurality of CCD detector segments being arranged in staggered relation with respect to said first plurality of CCD detector segments to define regions of overlap between respective opposing end portions of successive segment pairs within said second plurality of CCD detector segments and opposed end portions of individual ones of said first plurality of CCD detector segments; and d) said defocusing means comprises glass plate disposed over at least one of said regions of overlap, said glass plate having a thickness and index of refraction selected to provide a focus error in a range of about 0.5 to about 2.5 waves.

9. The wavefront sensor according to claim 8 wherein said at least one region of overlap having said glass plate disposed thereon lies within a diffraction-limited portion of a field of view of an input optics of the imaging system.

10. In a scanning imaging system, a wavefront sensor for generating focused and defocused images of an object scene that is being imaged by the imaging system from a single input optical beam impinged thereon, and wherein the focused and defocused images are combinable to estimate optical wavefront aberrations present in the imaging system, the wavefront sensor comprising:

a) a first photodetector and a second photodetector disposed in substantially parallel relation to one another and lying within a common focal plane of the imaging system, said first and second photodetectors for generating a first and second image, respectively, as an input optical beam moves over said first and second photodetectors in a cross scan direction;

b) a glass plate disposed over at least a portion of said second photodetector for inducing a known field-independent focus error in said input optical beam prior to impingement on said second photodetector; and wherein c) said first image generated by said first photodetector defining a best focused image of the object scene and said second image generated by said second photodetector and said glass plate defining a slightly defocused image of the object scene.

11. The wavefront sensor according to claim 10 which further includes:

a) computer means responsive to said first and second photodetectors for combining said best focused image and said slightly defocused image in a scene independent way to form a function which describes the optical wavefront aberrations present in the imaging system;

b) said computer means having an output indicative of said optical wavefront aberrations; and c) image processing means responsive to said output from said computer means for removing said optical wavefront aberrations from said first image to provide a corrected image with improved resolution.

12. The wavefront sensor according to claim 10 which further includes:

a) computer means responsive to said first and second photodetectors for combining said best focused image and said slightly defocused image in a scene independent way to form a function which describes the optical wavefront aberrations present in the imaging system;

b) said computer means having an output indicative of said estimated wave front aberrations; and c) said output from said computer means being adapted to drive an input of a deformable mirror.

13. The wavefront sensor according to claim 10 wherein said first and second photodetectors comprise linear CCD arrays and are disposed on a single substrate.

14. The wavefront sensor according to claim 13 wherein said glass plate has a thickness and index of refraction selected to provide a focus error in a range of about 0.5 to about 2.5 waves.

15. The wavefront sensor according to claim 14 wherein said first and second linear CCD arrays are located within a diffraction-limited portion of a field of view of an input optics of the imaging system.

16. In a scanning imaging system, a wavefront sensor for generating focused and defocused images of an object scene that is being imaged by the imaging system from a single input optical beam impinged thereon, and wherein the focused and defocused images are combinable to estimate optical wavefront aberrations present in the imaging system, the wavefront sensor comprising:

a) a first plurality of spaced apart photodetector segments arranged in linear end to end fashion and lying in a focal plane of the imaging system;

b) a second plurality of spaced apart photodetector segments arranged in linear end to end fashion, said second plurality of photodetector segments being arranged in juxtaposed staggered relation with respect to said first plurality of photodetector segments to define regions of overlap between respective opposing end portions of successive segment pairs within said second plurality of photodetector segments and opposed end portions of individual ones of said first plurality of photodetector segments;

c) said first and second plurality of photodetector segments for generating a first and second image, respectively, as an input optical beam moves thereover in a scanning direction;

d) a glass plate disposed over at least one of said regions of overlap, said glass plate for inducing a known focus error in said input optical beam prior to impingement on said second detector means; and wherein e) said first image generated by said first plurality of photodetector segments defining a best focused image of the object scene and said second image generated by said second plurality of photodetector segments and said glass plate defining a slightly defocused image of the object scene.

17. The wavefront sensor according to claim 16 which further includes:

a) computer means responsive to said first and second plurality of photodetector segments for combining said best focused image and said slightly defocused image in a scene independent way to form a function which describes the optical wavefront aberrations present in the imaging system;

b) said computer means having an output indicative of said optical wavefront aberrations; and c) image processing means responsive to said output from said computer means for removing said optical wavefront aberrations from said first image to provide a corrected image with improved resolution.

18. The wavefront sensor according to claim 16 which further includes:

a) computer means responsive to said first and second plurality of photodetector segments for combining said best focused image and said slightly defocused image in a scene independent way to form a function which describes the optical wavefront aberrations present in the imaging system;

b) said computer means having an output indicative of said estimated wave front aberrations; and c) said output from said computer means being adapted to drive an input of a deformable mirror.

19. The wavefront sensor according to claim 16 wherein said glass plate has a thickness and index of refractive selected to provide a focus error in a range of about 0.5 to about 2.5 waves.

20. The waveform sensor according to claim 19 wherein said at least one region of overlap having said glass plate disposed thereon lies within a diffraction-limited portion of a field of view of an input optics of the imaging system.

21. In a scanning imaging system, a wavefront sensor for generating focused and defocused images of an object scene that is being imaged by the imaging system from a single input optical beam impinged thereon, and wherein the focused and defocused images are combinable to estimate optical wavefront aberrations present in the imaging system, the wavefront sensor comprising:

a) a first and a second detector means disposed in substantially parallel relation to one another and lying within a focal plane of the imaging system, said first and second detector means for generating a first and second image, respectively, as an input optical beam moves over said first and second detector means in a cross scan direction, and wherein:

i) said first detector means comprises a first plurality of spaced apart CCD detector segments arranged in linear end to end fashion;

ii) said second detector means comprises a second plurality of spaced apart CCD detector segments arranged in linear end to end fashion;

iii) said second plurality of CCD detector segments being arranged in staggered relation with respect to said first plurality of CCD detector segments to define regions of overlap between respective opposing end portions of successive segment pairs within said second plurality of CCD detector segments and opposed end portions of individual ones of said first plurality of CCD detector segments;

b) defocusing means comprising glass plate disposed over at least one of said regions of overlap for inducing a known focus error in said input optical beam prior to impingement on said second detector means, said glass plate having a thickness and index of refraction selected to provide a focus error in a range of about 0.5 to about 2.5 waves; and wherein c) said first image generated by said first detector means defining a best focused image of the object scene and said second image generated by said second detector means and said defocusing means defining a slightly defocused image of the object scene.

22. The wavefront sensor according to claim 21 wherein said at least one region of overlap having said glass plate disposed thereon lies within a diffraction-limited portion of a field of view of an input optics of the imaging system.

* * * * *